INVENTOR.
CARL O. GRAVES
BY
H. K. Parsons & C. W. Wright
ATTORNEYS.

Feb. 26, 1957
C. O. GRAVES
2,782,490
MILLING CUTTER
Filed June 27, 1952
4 Sheets-Sheet 2
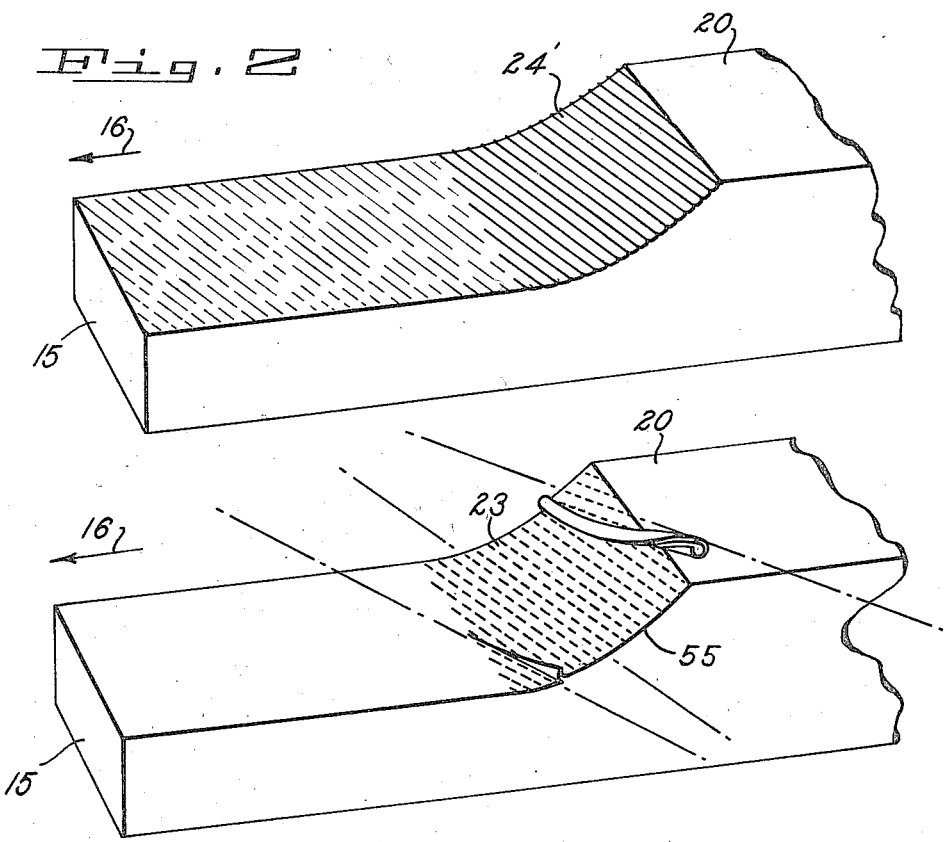
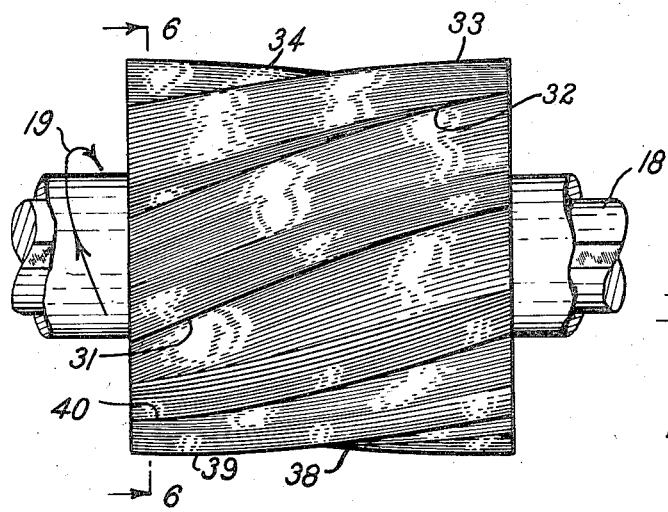
INVENTOR.
CARL O. GRAVES
BY
H. K. Parsons & L. W. Wright.
ATTORNEYS.

Feb. 26, 1957     C. O. GRAVES     2,782,490
MILLING CUTTER
Filed June 27, 1952     4 Sheets-Sheet 3
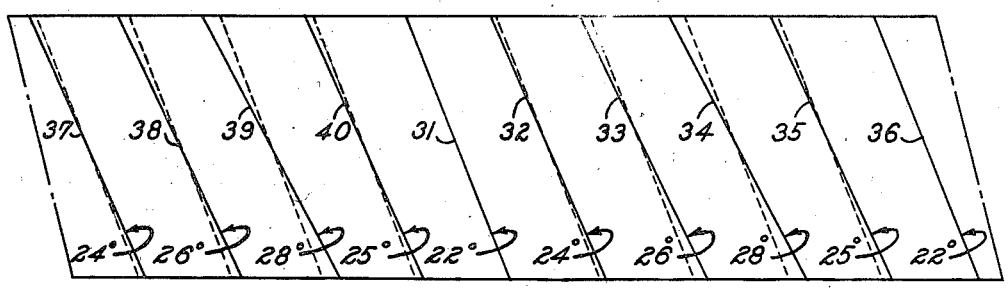
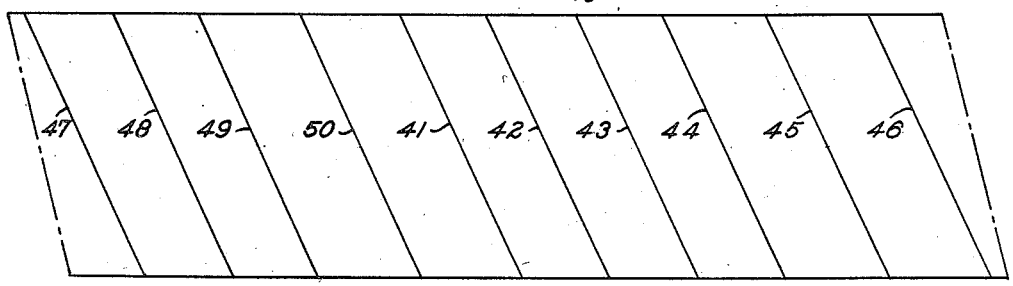
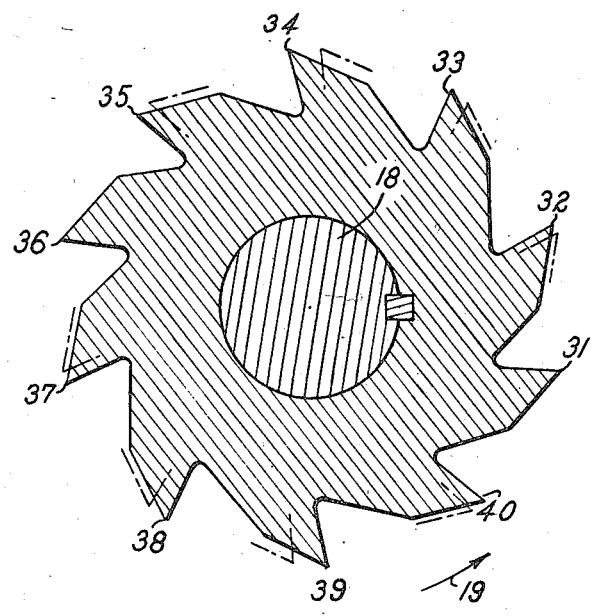
INVENTOR.
CARL O. GRAVES Feb. 26, 1957
C. O. GRAVES
2,782,490
MILLING CUTTER
Filed June 27, 1952
4 Sheets-Sheet 4
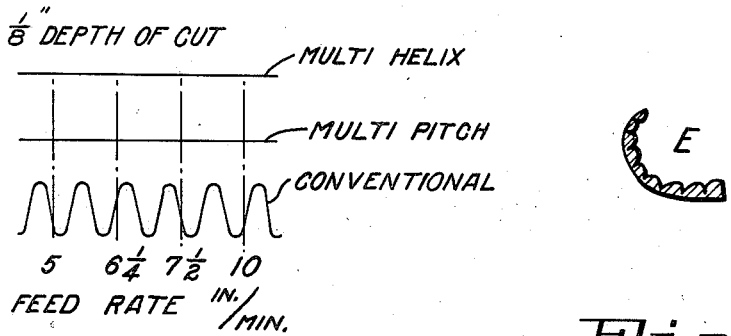
Fig. 9
Fig. 11
Fig. 10
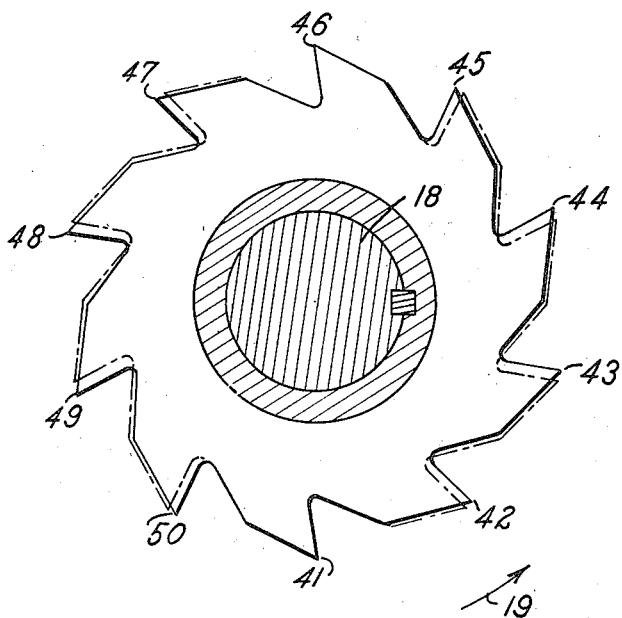
Fig. 8
INVENTOR.
CARL O. GRAVES
BY
H. K. Parsons + C. W. Wright.
ATTORNEYS.

United States Patent Office 2,782,490
Patented Feb. 26, 1957

2,782,490
MILLING CUTTER

Carl O. Graves, Norwood, Ohio, assignor to The Cincinnati Milling Machine Co., Cincinnati, Ohio, a corporation of Ohio Application June 27, 1952, Serial No. 295,927

1 Claim. (Cl. 29—103)

This invention relates to the formation of metal or similar work pieces by removal of stock therefrom by employment of a rotary cutter of the type of operation normally characterized as milling. In performance of milling operations and particularly with present-day high speed production requirements, it is desired to employ high speed cutter rotation combined with maximum rate of feed and depth of cut compatible with the capacity of the milling machine. Frequently, however, the rate of production cutting or stock removal is limited by the development of undue vibration or chatter. Chatter is objectionable because it mars the finish, thus reducing the commercial value of the machined part, and it also shortens the life of the cutter and the machine, making it commercially unprofitable to use the highest feeds and speeds which considerations of power and heating of the cutter would otherwise permit. Various attempts have been made to eliminate this chatter condition by provision of vibration dampening mechanisms, special machine bracings, and the like, but with only limited success.

It is, therefore, a prime object of the present invention to provide an improved method of milling and type of milling cutter structure for use in connection with such method will be effective to minimize chatter creating conditions at their source and thus make possible more efficient work production, both as to possible stock removal and improvement of final surface while increasing the life and efficiency of the machine on which the milling operation is performed.

The present invention further relates to a new principle of chatter elimination which can be incorporated in the design of the cutter to be used in carrying out the present novel chatter-free method of milling. The drawings illustrate two cutters exemplifying two methods of applying this principle involving respectively varying helix angles with varying tooth spacing, and varying tooth spacing alone, in connection with a plain spiral or helical mill. These two applications are referred to subsequently as multi-helix and multi-pitch cutters.

In employing the principles of this invention to eliminate chatter, as more fully set forth in the following description, it has been found that its use has resulted in increased production and cutter life to a degree greatly exceeding that which could be expected by one skilled in the art.

Figure 2 is a perspective view showing typical transient and finished surfaces produced by previously utilized peripheral milling cutters, indicating chatter pattern frequently produced by such milling cutters.

Figure 3 is a similar perspective view illustrating the break-up of the incipient chatter pattern effected by the present invention.

Figure 4 shows in elevation a peripheral milling cutter embodying the principles of the present invention.

Figure 5 is an expanded or developed view of the cutter shown in Figure 4, showing the individual relationship of the effective edges of the cutting teeth.

Figure 6 is a transverse section at 6—6 of Figure 4.

Figure 7 is an expanded or developed surface of a plain helical cutter in which the principles of the present invention have been applied by varying the pitch of the teeth while maintaining a constant helix angle.

Figure 8 is a diagrammatic end view of the cutter of Figure 7 illustrating the nature and extent of displacement of the individual cutting edges.

Figure 9 is a comparative chart showing the chatter elimination by employment of the present invention as compared to the corresponding conditions with a conventional cutter of the same type.

Figure 10 illustrates characteristic cross sectional views of the chip formations produced when utilizing the present invention.

Figure 11 illustrates corresponding sections of a chip produced under similar conditions utilizing a conventional milling cutter, showing the effect of the chatter produced by such cutters.

Figure 1:
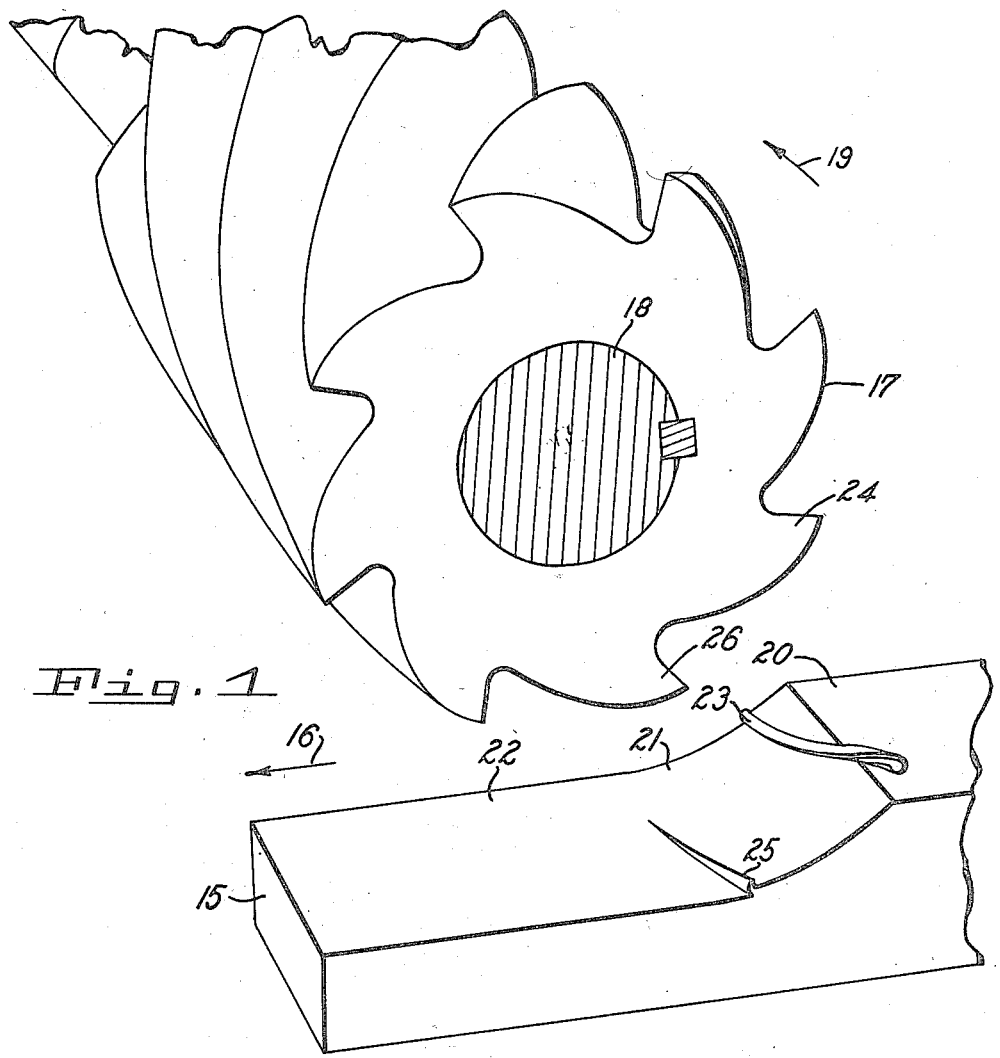
Figure 1 is a perspective view illustrative of the present invention.

Chatter in a milling operation may be defined as a self-energizing or regenerative vibration which builds up in intensity when once started. In the general case, sustained resonant vibratory movements in any physical system are caused by the action of a periodically modulated exciting force upon an elastically supported mass. The vibrating mass, when acted upon by the successive pulses of the modulated force, is driven through increasingly wide excursions until equilibrium is established between energy input and energy absorption. In the case of a milling cutter, the cutter and its supporting elements consititute the mass which is acted upon, and the cutting force is the exciting force. In so far as cutter design is concerned, the problem is to insure that the cutting force is kept as steady and free from modulation as possible.

In order to visualize how chatter originates, let us assume that a particular cutting edge of the milling cutter which contacts the work does not chatter but follows closely its prescribed path and generates a new surface of approximately cylindrical form. Actually the form of the path generated by a milling cutter on a travelling workpiece is trochoidal, but the departure from a true cylinder is very small compared to its radius. However, the surface formed will not be a geometrically perfect surface because many sources of vibration are always present: some external to the machine, some from gears and rotating parts of the machine itself, and some from the original tooth impacts and discontinuities in cutting action during the process of chip formation. Such shocks as are sustained by the cutter from any of these sources will cause minute deflections of its supporting system and therefore departures in the machined surface from the true geometrical form. From the general construction of any milling machine we may expect the displacements of the cutter to be combined radial and torsional deflections, with the direction of the cutter axis remaining very nearly constant. Thus, every movement of the cutter out of its proper position leaves a ridge or a valley on the work surface wherever a cutting edge is in contact with it. With a conventional cutter, all the cutting edges have the same helix angle; thus all the ridges will be parallel. Furthermore, each displacement of the cutter or its supporting system will not only cause one wave to appear on the contacting surface, but, because the cutter is part of a massive elastic system which is not critically damped, the original wave will be followed by a train of attenuated waves. Since these following waves are the result of free vibrations of the system, they will be roughly sinusoidal and their wavelength will be determined by the natural frequency of some particular mode of vibration of the supporting system for the cutter or work. Because the tooth impact frequencies normally encountered are much lower than these natural frequencies, we find trains of parallel waves corresponding in wavelength to a particular natural frequency of the cutter, or of the supporting system for the cutter or work, spread across the freshly cut surface at the time the next succeeding cutting edge contacts the work.

The thickness of the chip cut by the succeeding cutter tooth will now be modulated at the natural or resonant frequency of the system. Since the cutting force is a function of the instantaneous chip thickness and cutting speed, it will be similarly modulated. The cutter is therefore now being driven into oscillation by the waves which it has itself produced. Thus, we have the mechanism for a continuous oscillation. The energy to sustain and even increase the oscillation is provided by the inherent instability of the cutting action due to non-linearity of the cutting force with respect to both chip thickness and cutter speed.

As chatter builds up, there is a simultaneous building up of the pattern of parallel ridges and valleys on the work, as shown at Figure 2, and it has been discovered that the time required to reach an equilibrium condition is commonly a period corresponding to one or more revolutions of a ten-tooth cutter, or ten or more revolutions of a single tooth cutter. When the chatter has reached a state of equilibrium with a multi-tooth cutter we have observed that the wave length of the undulations on the freshly cut surface of the work is an exact sub-multiple of the tooth space of the cutter. This can be established by suddenly stopping the machine during a chattering cut. This observation furnishes additional proof that the building up of a regular pattern of parallel ridges and valleys on the work, which drive the machine into resonant vibration, requires the passage of several parallel cutting edges in accurately timed sequence. In a chattering cut, the chips are often broken up into segments or slivers instead of being formed as complete, unbroken units as shown in Figure 1.

Figure 5 shows a development of a plain spiral or "multi-helix" slab mill made according to the present invention. It will be noted that each successive tooth cutting edge is disposed at an angle to the cutter axis which is several degrees different from either the next preceding edge or the next following edge. Thus, the various cutting edges as they pass over the work in succession are effectively prevented from following the pattern produced by preceding teeth and therefore are prevented from building up a common chatter pattern.

In essence, therefore, during a chattering cut the cutter and workpiece, together with their driving and supporting members, constitute a dynamic system undergoing sustained resonant oscillation. The pattern of undulations on the work surface is an essential part of the feedback mechanism in the resonant dynamic system. The purpose of this invention is to interfere with the operation of this feedback mechanism, and thus oppose the resonant oscillation.

By employment of the present improved method of machining, and of cutter structures for utilization in the carrying out of that method, the building up of a disadvantageous free oscillation or resonant vibration has been prevented.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

The drawings illustrate two embodiments of the basic principles and structural features of the present invention and an example of the improvements secured by their use in actual milling operations. In Figure 1 the partially completed workpiece 15 is being fed in the direction indicated by the arrow 16, while cutter 17 mounted on arbor 18 is being rotated in direction indicated by the arrow 19. In the figure, the cutter is shown as somewhat elevated or withdrawn from the workpiece to permit an unobstructed view of a remnant 20 of the original surface of the work, the contiguous substantially cylindrical surface 21 with which the cutter was in engagement at the moment when the cutting process was arrested, hereinafter referred to as the transient surface, and the tangential newly-formed surface 22, hereinafter designated the machined surface. Upon the transient surface 21 are shown a nearly completed chip 23 which was in the process of being formed by a tooth 24 of the cutter and a sequential chip 25 in the initial stage of formation by a succeeding tooth 26 of the cutter.

Figure 2 shows the chattered type of transient surface and chattered machined surface which is often produced on a workpiece 15 by employment of a conventional plain spiral or helical milling cutter, and it will be noted that the several undulations 24' are equally spaced and parallel with the helix angle of the cutter teeth.

A 10-tooth plain spiral or "multi-helix" milling cutter embodying the principles of the present invention is shown in elevation in Figure 4, while Figure 5 is a development of the surface of revolution described by the cutting edges of the cutter of Figure 4. It will be noted that the cutting edge 31 has a helix angle of 22 degrees which it makes with the axial direction. It will be further noted that the four following cutting edges are all disposed at helix angles which differ from each other and from the given angle by a substantial amount. The angle of the fifth succeeding cutting edge which is diametrically opposite the given cutting edge is again identical with original given angle and so forth throughout the series of changes. Therefore, each cutting edge has an identical diametrically opposite counterpart. Referring to the individual cutting edges herein illustrated, and as an example of a satisfactory relationship the following series of angles have been used:

| | Degrees helix angle |
|---|---|
| Teeth 31 and 36 | 22 |
| Teeth 32 and 37 | 24 |
| Teeth 33 and 38 | 26 |
| Teeth 34 and 39 | 28 |
| Teeth 35 and 40 | 25 |

Measurements of any given tooth space taken progressively from end to end of the cutter at the cutting edges will show either a convergence or a divergence with respect to the adjacent cutting edge. In order to keep the range of this pitch variation to the minimum value consistent with the range of angles specified, the teeth are normally of approximately equal spacing at the midsection.

While the invention has been primarily illustrated and described in connection with variation of the helix angle, the principle of interference between the cutting edges and the regular chatter produced undulations of the transient surface can be accomplished for certain operations by varying the pitch alone in cases where it is impractical to vary the helix angle. The effectiveness of varying the helix angle in preventing the build-up of chatter can be appreciated by visualizing the bridging action, as indicated in exaggerated fashion in Figure 3, which results when a cutting edge is oriented differently from the incipient pattern 55 left by the preceding edge. A similar effect can result from a variation in pitch or tooth spacing. By considering the cutter motion in relation to the chatter pattern in respect to time rather than space, it becomes apparent that the conditions for the build-up of chatter no longer exist when the tooth impacts come at irregular intervals.

Reference to Figure 6, which is a transverse section at 6—6 of Figure 4, will show that the cutting edges are not equally spaced, and, therefore, the tooth impacts during a revolution of the cutter caused by engagement of the advanced or primary work engaging ends of the cutting faces of the teeth with the work will be irregular in a series of initial small increasing and subsequent decreasing amounts as indicated in Figures 5 and 6.

The developed surface of revolution, Figure 7, shows the variable pitch or irregular tooth spacing in which the helix angle is maintained constant. The cutting edges of the cutter have been displaced from their conventional equally spaced positions by different distances as follows:

|  | Inch |
| --- | --- |
| Teeth 41 and 46 | 0 |
| Teeth 42 and 47 | .074 |
| Teeth 43 and 48 | .087 |
| Teeth 44 and 49 | .112 |
| Teeth 45 and 50 | .058 |

Since the average spacing of the teeth of a 4" diameter, ten-tooth cutter will be 1.257", the multi-pitch cutter shown would have unequal spacings as follows:

|  | Inches |
| --- | --- |
| Tooth 41 to 42 | 1.331 |
| Tooth 42 to 43 | 1.270 |
| Tooth 43 to 44 | 1.280 |
| Tooth 44 to 45 | 1.204 |
| Tooth 45 to 46 | 1.200 |
| Tooth 46 to 47 | 1.331 |
| Tooth 47 to 48 | 1.270 |
| Tooth 48 to 49 | 1.280 |
| Tooth 49 to 50 | 1.204 |
| Tooth 50 to 41 | 1.200 |

The above numbers are chosen to meet the chatter conditions on a common size and type of milling machine where chatter frequencies of 40 to 100 cycles per second are to be expected. At the normal peripheral cutting speed of 68 surface feet per minute these frequencies would result in wave lengths of chatter pattern between .340" and .136", and the spacings are so chosen as to have no common divisor in this range.

It will be noted that in both forms of cutter above described, there is provided on the body portion a series of teeth whose cutting edges project equal amounts in a radial direction from the body portion to define a symmetrical cutting plane or surface of revolution circumscribing the axis of the body portion.

In the particular examples chosen for purposes of illustration, there are two corresponding series of teeth, each extending through an arc of 180 degrees, and in each of which the effective arcuate spacing between the adjacent teeth varies in the initial part of the series by increasing increments and in the latter part of the series by decreasing increments, the series preferably being correspondingly reproduced in the second 180 degree arc with the result that the spacing between diametrically opposite teeth and their preceding teeth are equal, and correspondingly the spacing between diametrically opposite teeth and their succeeding teeth are equal, but the spacings as respects the adjacent clockwise and counterclockwise cutting edges of their teeth are unequal.

The present novel method of machining a work piece consists in effecting a relative feeding movement between the rotating cutter and the workpiece with the successive cutting edges of the teeth engaging the workpiece at variably spaced points as respects the surface being formed to reduce resonant vibration between the cutter and workpiece.

Cutting tests in connection with ordinarily unavoidable milling machine chatter show that the vibration is such that an integral number of vibration waves produced on the freshly cut cylindrical breast of the cut will fit into the tooth spaces of the normal equi-spaced toothed cutter. In other words, the frequency of vibration is a multiple of the tooth impact frequency. To eliminate such chatter, it is important in the utilization of the present invention that the irregularities in the tooth spacing introduced are such that any frequency within a selected range can be suppressed. Most satisfactory results with the multi-pitch cutter can be obtained when there is not only a difference in tooth spacings but when such differences are of particular values. The largest difference should be of the order of half the wave length of the lowest frequency the cutter is designed to eliminate and the smallest difference of the order of half the wave length of the highest frequency which the cutter will eliminate while the remaining differences should be distributed between these extremes in an irregular manner so as to avoid having any common denominator.

The multi-helix cutter has the additional advantage that the tooth spacings can be made infinitely variable instead of variable by steps only as is the case with the multi-pitch type of cutter. This represents an ideal condition which introduces a new element into the geometry of the cutter and its action. In this case when an incipient pattern of parallel ridges and valleys is cut by one tooth, the following tooth is prevented by a slightly different helix angle from falling into the valleys. Instead, as shown in Figure 3, it bridges across from ridge to ridge, tending to wipe out the former incipient pattern and substitute one of its own. Cutting by this method in which the helix angle varies from tooth to tooth throws each increment of cutting edge out of phase by a different amount so that the integration of all force impulses received by the cutter from the incipient chatter pattern is practically zero.

The results of milling tests comparing the performance of a conventional cutter with equally spaced teeth having a common helix angle with the performance of a "multi-pitch" cutter and a multi-helix cutter under the same conditions are graphically represented in Figure 9.

These comparative cutting tests, as indicated, were made with a depth of cut of ⅛" and feed rates of 5, 6¼, 7½, and 10" respectively with the multi-helix and multi-pitch cutters of the present invention as contrasted with the results secured by use of a conventional equi-spaced tooth cutter. It will be noted that under these conditions no chatter was produced while using either form of cutter of the present invention but that appreciable chatter throughout the various feed rates was noted when using the standard type of cutter.

Figure 10 is a representation of photomicrographs of actual chips formed by the various teeth on the multi-helix and multi-pitch cutters used in the comparative tests, while Figure 11 shows the chip formation produced by the conventional cutter.

In Figure 10 there are illustrated at A, B, and C three magnified cross sections taken at different points along the length of a characteristic chip as produced by the multi-helix cutter of Figures 5 and 6 and at D characteristic cross section of the chip produced by use of the multi-pitch cutter of Figures 7 and 8.

As contrasted with these chips, there has been shown in Figure 11 a characteristic cross section of a chip removed by the standard equi-spaced tooth cutter. The chip structure shown here will be recognized by those skilled in the art as the type of chip structure resulting from chatter during the cut, being a partially segmented chip composed of a number of more or less closely joined segments of approximately equal dimensions. On the other hand, the chip structures shown at A, B, C, and D of Figure 9, are radically different from those of Figure 11 showing that those shown in Figure 10 were produced without chatter as indicated by their substantially smooth continuous form.

It can be plainly seen that the chips produced by the conventional cutter are partially segmented as the result of the vibratory nature of the cutter motion whereas all the chips produced by the cutters made according to the present invention are of the regular shape associated with a smooth and continuous cutting action. A second observation is that the changes in helix angles and tooth spacing required for suppression of chatter are of such moderate amounts that no measurable changes in the flow of the metal result.

It is to be understood that the particular examples and dimensions given herein are illustrative only and that the cutter structures and tooth relationships may be varied and modified to suit particular working conditions and varying cutter diameters including both variation of dimensional relationships and the number of groups or series of teeth embedded in a particular cutter without departing from or exceeding the spirit and teaching of the present invention as hereinafter defined in the appended claim.

What is claimed is:

A multi-helix milling cutter for use in milling operations in which the toothed periphery of the cutter is rotated to successively individually engage its teeth with a workpiece during relative traversing movement of the cutter and workpiece, said cutter comprising a body portion having a multiplicity of circumferentially spaced helically extending peripheral teeth formed with cutting edges of equal radial extent to define a surface of revolution, said teeth including diametrically opposite teeth having corresponding basic helix angles, each followed by a succession of intermediate helical teeth of similar angle, the helix angles of said intermediate teeth varying one from the other serially by small increments in a progression of initially incrementally increasing and subsequently incrementally decreasing angles, the circumferential spacing of said teeth being substantially equal in a central axially transverse plane of said cutter, and the spacing of said intermediate teeth at the advanced ends of their cutting faces varying progressively in a series of initial small increasing and subsequent decreasing amounts, whereby during cutting as the cutter is rotated and relative traverse is effected between the cutter and workpiece the sequentially operating initial work engaging advanced ends of the respective individual teeth of said rotating cutter will effect non-periodic sequential engagement with a workpiece in a manner to prevent development of a chatter pattern during cutting.

References Cited in the file of this patent

UNITED STATES PATENTS

| | | |
|---|---|---|
| 725,374 | Shaw | Apr. 14, 1903 |
| 1,882,690 | Albertson | Oct. 18, 1932 |
| 1,948,057 | Tscherne | Feb. 20, 1934 |
| 1,974,620 | Mesing | Sept. 25, 1934 |
| 1,988,770 | Alexander | Jan. 22, 1935 |
| 2,124,818 | Gouverneur | July 26, 1938 |
| 2,528,300 | Degner | Oct. 31, 1950 |